United States Patent
Tsutsumi et al.

(10) Patent No.: US 10,612,210 B2
(45) Date of Patent: *Apr. 7, 2020

(54) VERTICALLY-MOVABLE STEPS FOR WORKING VEHICLES

(71) Applicant: Komatsu Ltd., Minato-ku, Tokyo (JP)

(72) Inventors: Katsuhiro Tsutsumi, Hitachinaka (JP); Takehito Takahashi, Hitachinkaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/555,631

(22) PCT Filed: Mar. 23, 2015

(86) PCT No.: PCT/JP2015/058724
§ 371 (c)(1),
(2) Date: Sep. 5, 2017

(87) PCT Pub. No.: WO2016/151729
PCT Pub. Date: Sep. 29, 2016

(65) Prior Publication Data
US 2018/0044884 A1    Feb. 15, 2018

(51) Int. Cl.
*B60R 3/02*    (2006.01)
*E02F 9/08*    (2006.01)
*E02F 9/16*    (2006.01)

(52) U.S. Cl.
CPC ............ *E02F 9/0833* (2013.01); *B60R 3/02* (2013.01); *E02F 9/16* (2013.01)

(58) Field of Classification Search
CPC ................................ B60R 3/02; E02F 9/0833
See application file for complete search history.

(56) References Cited

U.S. PATENT DOCUMENTS

| | | | |
|---|---|---|---|
| 285,569 A | * | 9/1883 | Castle |
| 4,231,449 A | * | 11/1980 | Laurita ..................... E06C 1/36 182/164 |

(Continued)

FOREIGN PATENT DOCUMENTS

| | | |
|---|---|---|
| CN | 1775592 | 5/2006 |
| DE | 2409486 | 9/1975 |

(Continued)

OTHER PUBLICATIONS

International Preliminary Report on Patentability in International Application No. PCT/JP2015/058724, dated Sep. 26, 2017, 6 pages (with English translation).

(Continued)

*Primary Examiner* — Alvin C Chin-Shue
(74) *Attorney, Agent, or Firm* — Fish & Richardson P.C.

(57) ABSTRACT

A ladder includes: a front connecting member and a rear connecting member at a top step, respective upper ends of which are connected to a lateral side of a vehicle body in a pivotally movable manner and are juxtaposed with a predetermined space therebetween in a vehicle front-back direction; a front connecting member and a rear connecting member which are provided at a step under the top step, and respective upper ends of which are connected in a pivotally movable manner to both ends in the vehicle front-back direction of a step board. The front connecting member and the rear connecting member at least at the top step among steps positioned above a lowest step are rigid members. The front connecting member and the rear connecting member at the lowest step among steps positioned under the top step are elastically deformable.

17 Claims, 4 Drawing Sheets

(56) References Cited

U.S. PATENT DOCUMENTS

| | | | |
|---|---|---|---|
| 6,000,496 A | 12/1999 | Rinaldi | |
| 9,688,204 B2* | 6/2017 | Tsutsumi | B60R 3/02 |
| 2006/0011416 A1* | 1/2006 | Gonzalez y Gil | B60R 3/02 |
| | | | 182/127 |
| 2007/0017743 A1* | 1/2007 | Yeh | B60R 3/02 |
| | | | 182/127 |
| 2007/0119655 A1* | 5/2007 | Caudill | B60R 3/02 |
| | | | 182/97 |
| 2014/0319794 A1* | 10/2014 | Mullas | B60R 3/02 |
| | | | 280/166 |
| 2015/0184360 A1* | 7/2015 | Aoyama | F02M 35/164 |
| | | | 180/68.3 |
| 2016/0339843 A1* | 11/2016 | Rinaldi | B60R 3/02 |

FOREIGN PATENT DOCUMENTS

| | | | | |
|---|---|---|---|---|
| JP | S53-148427 | | 11/1978 | |
| JP | H04-001048 | | 1/1992 | |
| JP | 2000-247184 | | 9/2000 | |
| JP | 2001294092 A | * | 10/2001 | ............ E02F 9/0833 |
| JP | 2008-240278 | | 10/2008 | |
| JP | 3146866 | | 12/2008 | |
| JP | 2013-002209 | | 1/2013 | |
| JP | 2014-201890 | | 10/2014 | |

OTHER PUBLICATIONS

International Search Report and Written Opinion in International Application No. PCT/JP2015/058724, dated Apr. 28, 2015, 8 pages, with English Translation.

Japanese Notice of Reason(s) for Rejection in Japanese Application No. JP2017-507190, dated Jun. 5, 2018, 4 pages, with English translation.

European Extended Search Report in European Application No. 15886284.7, dated Jul. 10, 2018, 7 pages.

Chinese Office Action in Chinese Application No. 201580077706.0, dated Jan. 29, 2019, 14 pages with English Translation.

* cited by examiner

VERTICALLY-MOVABLE STEPS FOR WORKING VEHICLES

CROSS-REFERENCE TO RELATED APPLICATIONS

This application claims priority to International Application No. PCT/JP2015/058724 filed on Mar. 23, 2015, the contents of which are incorporated herein in their entirety.

TECHNICAL FIELD

The present invention relates to a ladder of a working vehicle.

BACKGROUND ART

In a working vehicle such as a wheel loader, it has typically been known to provide a ladder for an operator to climb up and down in order to move between the ground and an engine compartment (see, for instance, Patent Literature 1). Such a ladder is provided posterior to rear wheels in a manner to be suspended downward from a vehicle body.

However, a part of the ladder of the wheel loader, which is suspended downward below a departure-angle-defining line connecting a ground touching portion of each of the rear wheels and a lower surface of a counter weight near the back of the vehicle, may be damaged by contact with the ground when a front of the vehicle body is inclined upward during a scraping operation while climbing a mound.

The ladder disclosed in Patent Literature 1 includes: an upper step board having a fixed step board portion disposed near the front of the vehicle and a rotary step board portion that is connected in a pivotally movable manner to the fixed step board portion and is disposed near the back of the vehicle; an elastically deformable first suspension member, an upper end of which is connected in a pivotally movable manner to a front end of the fixed step board portion; an elastically deformable second suspension member, an upper end of which is connected to a rear end of the rotary step board portion; and a lower step board that is connected in a pivotally movable manner to the first and second suspension members.

With this arrangement, when the lower step board comes into contact with the ground during the scraping operation, the lower step board receives external force to be pushed backward. At this time, the lower step board pivots on the first and second suspension members, the first and second suspension members pivot on the fixed step board portion and the rotary step board portion, and the rotary step board portion pivots upward on the fixed step board portion. Accordingly, the entire ladder is folded and received between a fixing portion of the ladder to the vehicle body and the ground, in other words, above the departure-angle-defining line in alignment with the ground, so that damage to the lower step board and the like can be prevented.

On the other hand, Patent Literature 2 discloses a large-sized hydraulic excavator having a ladder in the front of the vehicle body. Patent Literature 2 proposes providing a further step to a lower end of the ladder. The ladder is for the operator to climb up and down from the front of the vehicle. The ladder is configured in a four-link mechanism in which two parallel links are suspended in a pivotally movable manner in a vehicle front-back direction from one of side plates in a vehicle width direction of the ladder, two parallel links are suspended in a pivotally movable manner also from the other of the side plates in the vehicle width direction, and a step board is provided in a pivotally movable manner to the parallel links provided apart in the vehicle width direction.

Also in such a configuration of the ladder, when the vehicle sinks below a surface of a soft ground due to its own weight to cause a lower end of the ladder to contact with the ground, the step board pivots on lower ends of the parallel links to move upward, so that damage to the step board and the like can be prevented. Moreover, since the ladder is additionally attached to the lower end of the ladder and the step board is close to the ground, the ladder can facilitate access to the ladder from the ground.

CITATION LIST

Patent Literature(s)

Patent Literature 1: JP2013-2209A
Patent Literature 2: JP2008-240278A

SUMMARY OF THE INVENTION

Problems to be Solved by the Invention

In recent years, it has been demanded to achieve easier access to the ladder by further decreasing a height from the ground to the lowest step board of the ladder.

However, in the typical ladder disclosed in Patent Literature 1, since the first and second suspension members are freely deformable, with an arrangement in which the length of each of the first and second suspension members is simply increased and the number of the step board is simply increased as needed, when the operator steps on the step board for climbing up and down the ladder, the first and second suspension members are deformed (e.g., twisted) to greatly swing the ladder toward a side remote from the climbing operator and make the ladder unstable, thereby making it difficult for the operator to climb up and down the ladder.

In a typical ladder of Patent Literature 2, since a link connected to each end of the step board are metallic, stability of the ladder when climbed up and down by an operator appears to be not considerably declined as compared with the ladder of Patent Literature 1. However, since the step board provided closer to the ground is more likely to hit a rock or the like on the ground, the link is likely to be considerably deformed to adversely affect durability. Particularly, such a problem is noticeable when the link is brought into contact with the ground during an operation as occurring in a wheel loader.

An object of the invention is to provide a ladder of a working vehicle which is easily climbed up and down and is excellent in durability even when a height from the ground to the ladder is decreased.

Means for Solving the Problems

According to an aspect of the invention, a ladder of a working vehicle includes: a plurality of steps including at least a top step and a lowest step, each of the steps including: a step board; and a front connecting member and a rear connecting member, respective lower ends of which are connected in a pivotally movable manner to both ends of the step board in a vehicle front-back direction, in which the front connecting member and the rear connecting member at the top step have respective upper ends connected in a pivotally movable manner to a lateral side of a vehicle body and are juxtaposed with a predetermined space therebetween in a vehicle front-back direction, respective upper ends of the front connecting member and the rear connecting member at each of the steps positioned under the top step are connected in a pivotally movable manner to both ends in the vehicle front-back direction of the step board of immediately-above one of the steps, the front connecting member and the rear connecting member at least at the top step among the steps positioned above the lowest step are rigid members, and the front connecting member and the rear connecting member at least at the lowest step among the steps positioned under the top step are elastically deformable.

According to another aspect of the invention, a ladder of a working vehicle in a two-step structure includes: a first front connecting member and a first rear connecting member, respective upper ends of which are connected in a pivotally movable manner to a lateral side of a vehicle body, and which are juxtaposed with a predetermined space in a vehicle front-back direction; a first step board that is connected in a pivotally movable manner to respective lower ends of the first front connecting member and the first rear connecting member; a second front connecting member and a second rear connecting member, respective upper ends of which are connected in a pivotally movable manner to both ends of the first step board in the vehicle front-back direction; and a second step board that is connected in a pivotally movable manner to respective lower ends of the second front connecting member and the second rear connecting member, in which the first front connecting member and the first rear connecting member are rigid members, and the second front connecting member and the second rear connecting member are elastically deformable.

According to still another aspect of the invention, a ladder of a working vehicle in a three-step structure includes:

a first front connecting member and a first rear connecting member, respective upper ends of which are connected to a lateral side of a vehicle body, and which are juxtaposed with a predetermined space in a vehicle front-back direction; a first step board that is connected in a pivotally movable manner to respective lower ends of the first front connecting member and the first rear connecting member; a second front connecting member and a second rear connecting member, respective upper ends of which are connected in a pivotally movable manner to both ends of the first step board in the vehicle front-back direction; a second step board that is connected in a pivotally movable manner to respective lower ends of the second front connecting member and the second rear connecting member; a third front connecting member and a third rear connecting member, respective upper ends of which are connected in a pivotally movable manner to both ends of the second step board in the vehicle front-back direction; and a third step board that is connected in a pivotally movable manner to respective lower ends of the third front connecting member and the third rear connecting member, in which the first front connecting member, the first rear connecting member, the second front connecting member, and the second rear connecting member are rigid members, and the third front connecting member and the third rear connecting member are elastically deformable.

It should be noted that the "rigid member" is a member made of a material such as one for positively avoiding elastic deformation. Elastically deformation of a member used as the rigid member is allowable. On the other hand, "to be elastically deformable" means to be positively elastically deformable.

According to the above aspects of the invention, since the front connecting member and the rear connecting member which are at the top of the ladder and connected to the vehicle body are rigid members, even when the length of the suspended part of the ladder is increased to decrease the height from the ground, swinging of a lowest step board toward a side remote from an operator stepping thereon is reducible, so that the operator can easily climb up and down the ladder. Moreover, since the front connecting member and the rear connecting member at the lowest step are elastically deformable, even when the front connecting member and the rear connecting member are more frequently contacted with the ground since the length of the suspended part of the ladder is increased to decrease the height from the ground, the front connecting member and the rear connecting member are not easily damaged, thereby enabling to improve durability.

With this arrangement, it is preferable that each of the front connecting member and the rear connecting member that are elastically deformable includes a laminate of a plurality of elastic plates.

With this arrangement, it is preferable that each of upper and lower ends of each of the front connecting member and the rear connecting member is connected, in a pivotally movable manner, to a connecting bracket fixed to the vehicle body or a connecting bracket provided at each of ends of all the step boards in the vehicle front-back direction, and the connecting bracket includes a cutout hole that is open upward and/or downward and receives the pivoting front connecting member and the pivoting rear connecting member.

With this arrangement, it is preferable that the ladder of a working vehicle is folded between a departure-angle-defining line that connects a wheel of the vehicle body and a vehicle rear bottom of the vehicle body and connected positions of the front connecting member and the rear connecting member to the vehicle body.

DESCRIPTION OF EMBODIMENT(S)

First Exemplary Embodiment

A first exemplary embodiment of the invention will be described below with reference to the attached drawings.

Figure 1:
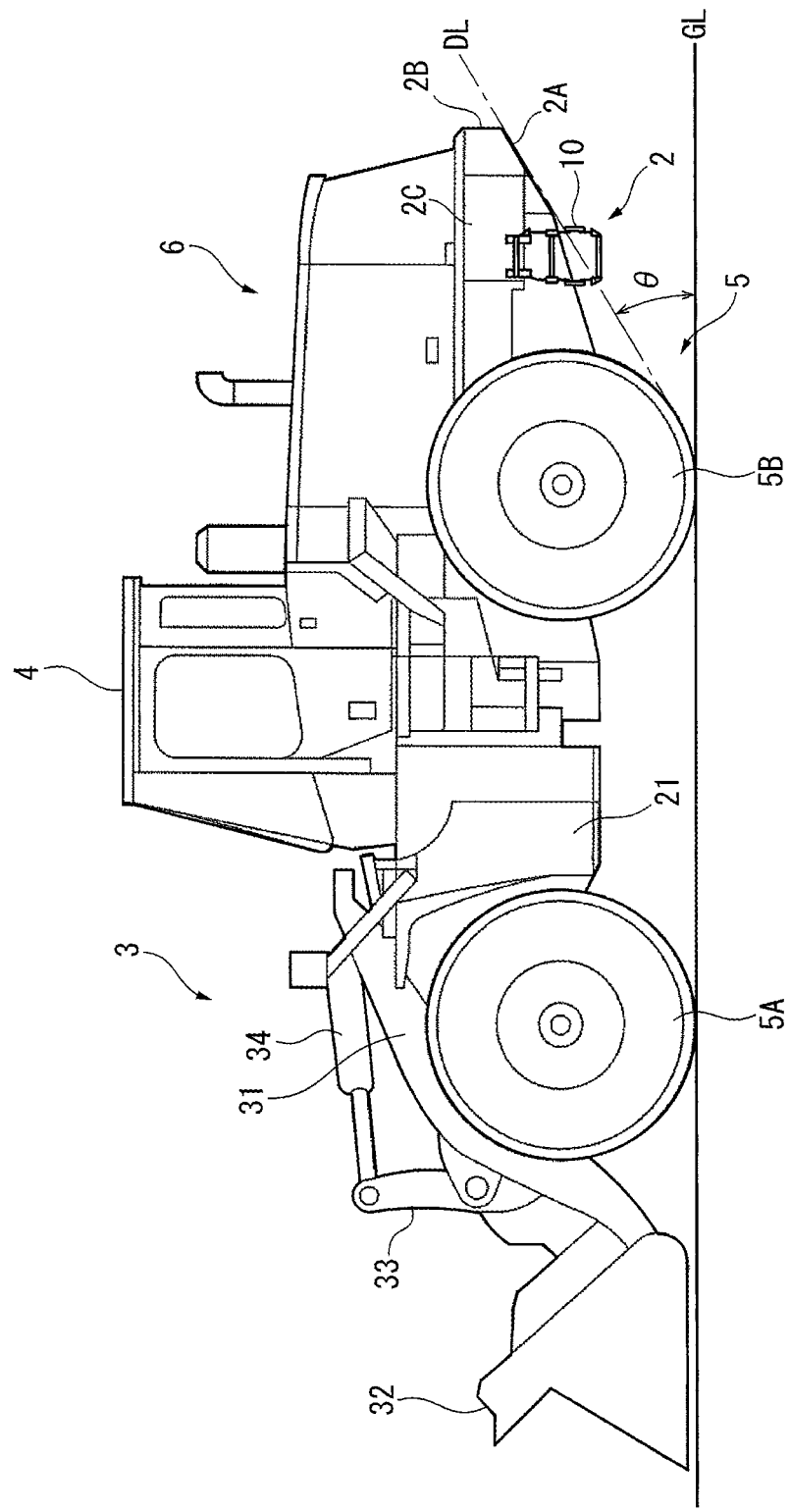
FIG. 1 is a perspective view of a working vehicle using a ladder according to a first exemplary embodiment of the invention.
Figure 2:
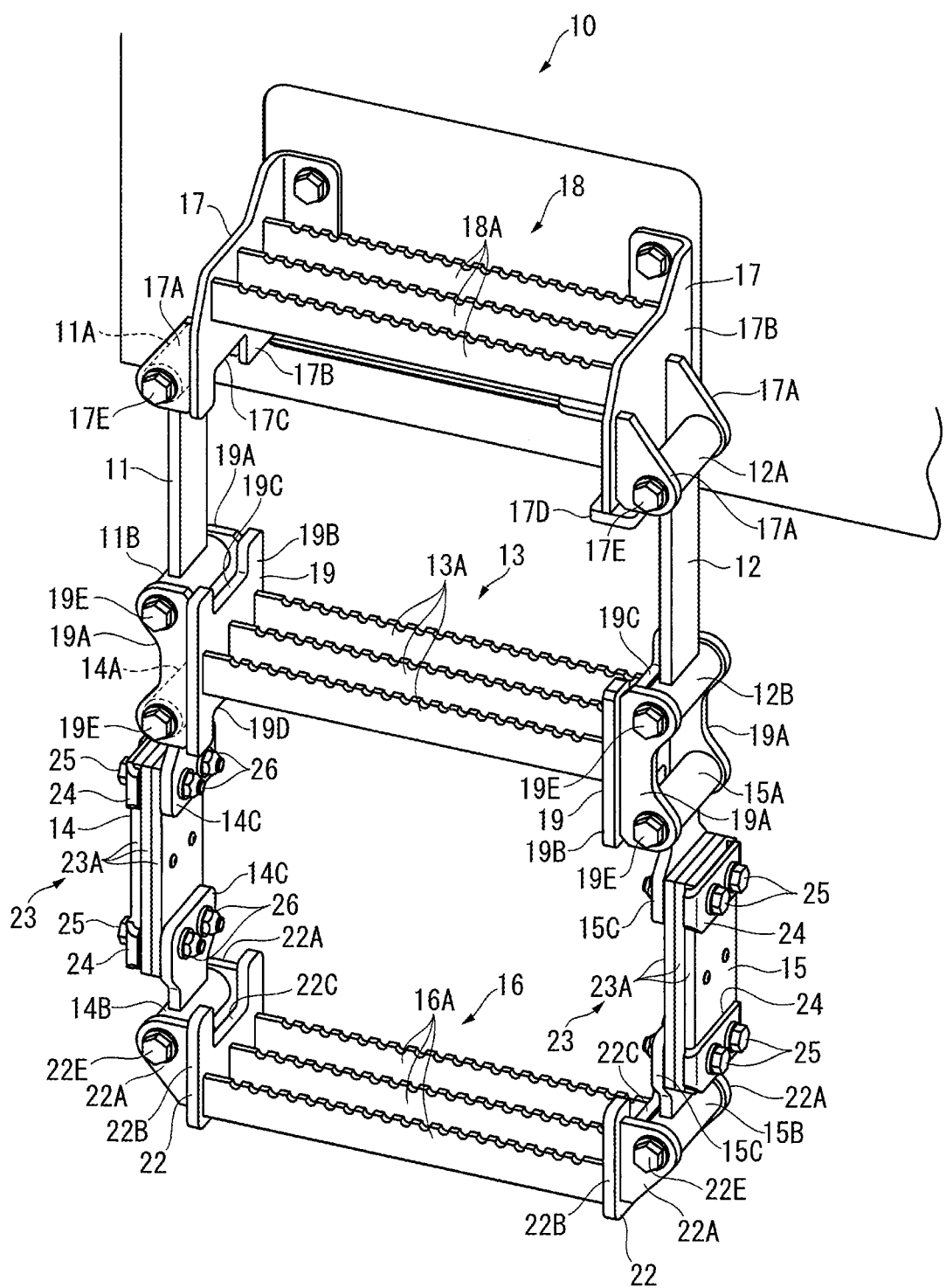
FIG. 2 is a perspective view of the ladder.

FIG. 1 is a perspective view of a wheel loader 1 (working vehicle) using a ladder 10 according to the first exemplary embodiment of the invention. FIG. 2 is a perspective view of the ladder 10.

Description of Overall Wheel Loader

As shown in FIGS. 1 and 2, the wheel loader 1 includes a vehicle body 2, working equipment 3, cab 4, traveling device 5, and power output section 6.

The vehicle body 2 is formed of a steel frame for supporting the working equipment 3, the cab 4, and the power output section 6. A structure body 21 is provided to a front of the vehicle body 2 in a manner to be revolvable in a right-left direction relative to the vehicle body 2. The working equipment 3 is provided to the vehicle body 2 anterior to the structure body 21.

The working equipment 3 includes booms 31 that are pivotally supported by the structure body 21, a bucket 32 that is pivotally supported by the booms 31 to move upward and downward, and a bell crank 33 that is pivotally supported by a middle portion between the booms 31.

The booms 31 are provided in a pair in a vehicle width direction and are pivotally supported by the structure body 21 to move upward and downward. A lift cylinder (not shown) is pivotally supported by a middle portion provided between the booms 31, a base of the lift cylinder being pivotally supported by the structure body 21. The lift cylinder is hydraulically expanded and contracted to move the booms 31 upward and downward.

The bucket 32 is a portion for loading dug soil and the like. The bucket 32 is pivotally supported by a first end of a link (not shown) at a position higher than a position where the bucket 32 is pivotally supported by the booms 31. A second end of the link is pivotally supported by a lower end of the bell crank 33.

The bell crank 33 is pivotally supported by the booms 31. The lower end of the bell crank 33 is connected to a base (second end) of the link. A tilt cylinder 34 is pivotally supported by an upper end of the bell crank 33. A base of the tilt cylinder 34 is pivotally supported by the structure body 21.

The wheel loader moves forward with the bucket 32 positioned near the ground. When the lift cylinder is expanded while the bucket 32 is digging in soil and sand and the like (a digging target), the booms 31 are moved upward with the bucket 32 loaded with the dug soil, so that the digging operation can be performed. Further, when the tilt cylinder 34 is contracted while the bucket 32 is located at a high position, the upper end of the bell crank 33 is moved toward the vehicle body 2, so that the lower end of the bell crank 33 is moved toward a front of the vehicle. Accordingly, the link pushes an upper portion of the bucket 32 toward the front of the vehicle to revolve the bucket 32, so that the dug soil loaded in the bucket 32 can be put down into a bed of a dump truck and the like.

The traveling device 5 includes: front wheels 5A and rear wheels 5B that are respectively provided at four positions of lateral sides of the vehicle body 2; axles (not shown in FIGS. 1 and 2) that rotatably support the front wheels 5A and the rear wheels 5B to the vehicle body 2; and a drive shaft that is connected to each of the axles via a differential gear substantially at a middle in the vehicle width direction of the vehicle body 2. The drive shaft is connected to an engine installed in the power output section 6 via a torque converter. When the engine is rotated, a rotation speed is converted by a transmission via the torque converter to rotate the drive shaft. The rotation of the drive shaft is transmitted to the front wheels 5A and the rear wheels 5B via the differential gear and the axles, so that the wheel loader 1 travels.

The ladder 10 for an operator and a maintenance engineer to climb up and down in order to move between the ground and an engine compartment is provided on a lateral side of the vehicle body 2 and between one of the rear wheels 5B and a rear end 2A of the vehicle body 2. In recent years, it has been desired to decrease a height from the ground GL to the ladder 10 for easier access to the ladder 10 (assuming that the height is 600 mm in an exemplary embodiment of the invention), so that a length of a suspended part of the ladder 10 below the vehicle body 2 is longer than a typical one. Consequently, a lower end of the ladder 10 is suspended beyond a departure-angle-defining line DL more prominently than a typical ladder. Note that the departure-angle-defining line DL is a line connecting one of the rear wheels 5B and a counter-weight lower surface 2B (rear bottom) of the vehicle body 2 and defines a departure angle θ.

One of the operations of the wheel loader 1 is a scraping operation. This operation is performed by the wheel loader 1 climbing up a mound while scraping the ground in front of the wheel loader 1. As the wheel loader 1 climbs up the mound, the front of the vehicle body 2 is inclined upward. At this time, the maximum range in which the vehicle body 2 can be inclined is determined by the departure angle θ. During the scraping operation, the vehicle body 2 is occasionally inclined in the maximum range, in which a part of the ladder 10 which is suspended beyond the departure-angle-defining line DL comes into contact with the ground GL. For this reason, the ladder generally has a foldable structure in which the ladder is folded to avoid contact with the ground in the case of contact with the ground GL. Also in the ladder 10 of the exemplary embodiment, the foldable structure is used to solve the problem caused when the length of the suspended part of the ladder 10 is increased. The ladder 10 will be described in detail below.

Description of Overall Steps

Figure 3:
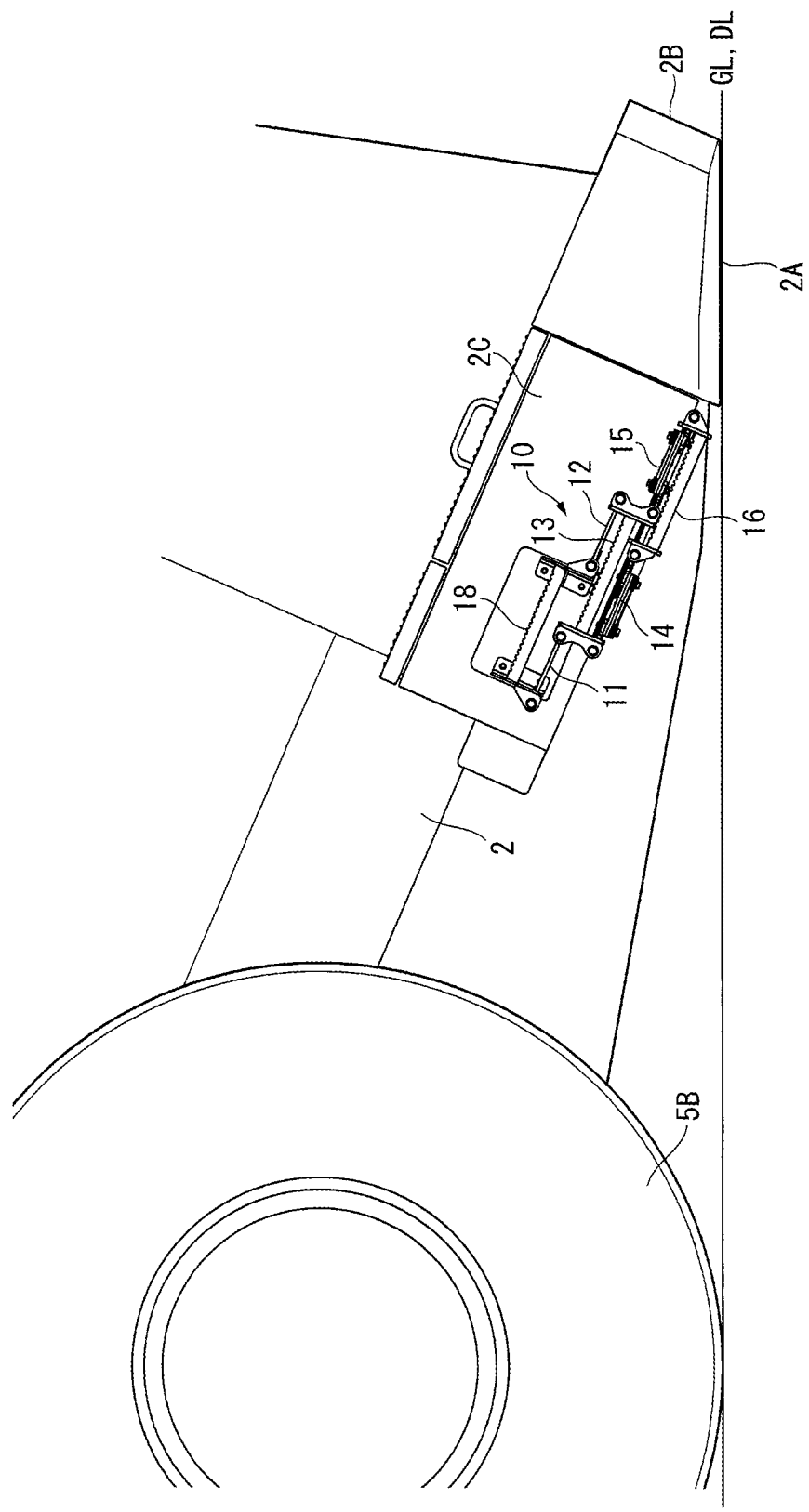
FIG. 3 is a side elevational view showing the ladder during a scraping operation by the working vehicle.

FIG. 2 is a perspective view of the ladder 10. FIG. 3 is a side elevational view showing the ladder 10 during a scraping operation by the wheel loader 1.

As shown in FIGS. 2 and 3, the ladder 10 in a two-step structure includes: a first front connecting member 11 and a first rear connecting member 12, respective upper ends of which are connected in a pivotally movable manner to a lateral side of the vehicle body 2 and which are juxtaposed with a predetermined space in a vehicle front-back direction; a first step board 13 connected in a pivotally movable manner to respective lower ends of the first front connecting member 11 and the first rear connecting member 12; a second front connecting member 14 and a second rear connecting member 15, respective upper ends of which are connected in a pivotally movable manner to both ends of the first step board 13 in the vehicle front-back direction; and a second step board 16 that is connected in a pivotally movable manner to respective lower ends of the second front connecting member 14 and the second rear connecting member 15. The first front connecting member 11 and the first rear connecting member 12 each are a rigid member (e.g., a metal material). The second front connecting member 14 and the second rear connecting member 15 are formed including an elastic material and elastically deformable.

Specifically, the ladder 10 has a two-step structure including: one step defined by the first step board 13, and the first front connecting member 11 and the first rear connecting member 12, respective lower ends of which are connected to the first step board 13 in a pivotally movable manner; and one step defined by the second step board 16, and the second front connecting member 14 and the second rear connecting member 15, respective lower ends of which are connected to the second step board 16 in a pivotally movable manner. As a whole, the ladder 10 has two step boards (i.e., the first step board 13 and the second step board 16). The upper ends of the second front connecting member 14 and the second rear connecting member 15 are connected to both ends of the first step board 13 immediately above the second front connecting member 14 and the second rear connecting member 15.

Description of Folding Structure of Steps

More specifically, a box 2C such as a battery box and a tool box is provided to the lateral side of the vehicle body 2. A pair of metallic connecting brackets 17 are fixed to a lateral side of the box 2C with bolts in a manner to be spaced from each other in the vehicle front-back direction. The respective upper ends of the first front connecting member 11 and the first rear connecting member 12 are attached to the connecting brackets 17 in a pivotally movable manner. The respective upper ends of the first front connecting member 11 and the first rear connecting member 12 are defined as cylindrical portions 11A and 12A. Each of the cylindrical portions 11A and 12A is interposed between a pair of attachment pieces 17A provided to the connecting brackets 17. The cylindrical portions 11A and 12A respectively pivot on bolts 17E (pivots) that penetrate the corresponding cylindrical portions 11A and 12A and the attachment pieces 17A in the vehicle width direction and are horizontal to the vehicle width direction. In the exemplary embodiment, the front and rear connecting brackets 17 are mutually jointed by three steel plates 18A. The three steel plates 18A provide a top step board 18.

Lower ends of the first front connecting member 11 and the first rear connecting member 12 and upper ends of the second front connecting member 14 and the second rear connecting member 15 are respectively defined as cylindrical portions 11B, 12B, 14A and 15A. Connecting brackets 19 are provided to both ends of the first step board 13 in the vehicle front-back direction. Each of the connecting brackets 19 includes a pair of attachment pieces 19A. The cylindrical portions 11B, 12B, 14A and 15A are attached in a pivotally movable manner to the pair of attachment pieces 19A with a bolt 19E (a pivot).

The first step board 13 is provided by three steel plates 13A jointed between the front and rear connecting brackets 19.

Similarly, lower ends of the second front connecting member 14 and the second rear connecting member 15 are respectively defined as cylindrical portions 14B and 15B. Connecting brackets 22 are provided to both ends of the second step board 16 in the vehicle front-back direction. Each of the connecting brackets 22 includes a pair of attachment pieces 22A. The cylindrical portions 14B and 15B are attached to the pair of attachment pieces 22A with a bolt 22E (a pivot).

The second step board 16 is also provided by three steel plates 16A jointed between the front and rear connecting brackets 22.

The connecting brackets 19 and 22 are made of metal.

Thus, the folding structure of the ladder 10 is achieved by the mutual pivotal movement of the connecting members 11, 12, 14 and 15 and the step boards 13 and 16.

Description of Elastic Structure of Connecting Member

The second front connecting member 14 and the second rear connecting member 15 each include a block laminate 23 in which a plurality of elastic plates 23A formed of an elastic material (e.g., synthetic rubber and natural rubber) are integrally riveted. Metallic hinge members 14C and 15C respectively formed with the cylindrical portions 14A and 14B and the cylindrical portions 15A and 15B are fixed to upper and lower ends of the laminate 23 with a seat 24, a bolt 25 and a nut 26. With the elastically deformable laminate 23, the second front connecting member 14 and the second rear connecting member 15 are less likely to be damaged even in contact with rocks and the like on the ground.

Description of Interference Prevention Structure of Connecting Bracket

Further, each of the connecting brackets 17 has the attachment pieces 17A and a bonding piece 17B bonded with the top step board 18. In the front connecting bracket 17, the bonding piece 17B has a cutout hole 17C that is open downward in a U-shape and positioned between the attachment pieces 17A. When the first front connecting member 11 and the first rear connecting member 12 pivot, each upper end of the first front connecting member 11 and the first rear connecting member 12 is to be received in the cutout hole 17C, thereby preventing mutual interference between the first front connecting member 11/the first rear connecting member 12 and the connecting bracket 17 when the ladder 10 is folded. On a lower surface of the rear connecting bracket 17, a regulating plate 17D configured to regulate pivotal movement toward the rear wheels 5B (i.e., forward) is provided. The regulating plate 17D regulates a folding amount of the ladder 10 in order to avoid the lower end of the ladder 10 from reaching to be caught by one of the rear wheels 5B.

Similarly, the bonding piece 19B of each of the connecting brackets 19 has a cutout hole 19C that is open upward in a U-shape and a cutout hole 19D that is open downward in a U-shape, the cutout holes 19C and 19D being provided at corresponding positions between the attachment pieces 19A. When the first front connecting member 11 and the first rear connecting member 12 pivot, each lower end of the first front connecting member 11 and the first rear connecting member 12 is to be received in the cutout hole 19C. When the second front connecting member 14 and the second rear connecting member 15 pivot, each upper end of the second front connecting member 14 and the second rear connecting member 15 is to be received in the cutout hole 19D. Accordingly, the first front connecting member 11 and the first rear connecting member 12 are prevented from interfering with the corresponding connecting brackets 19 while the second front connecting member 14 and the second rear connecting member 15 are prevented from interfering with the corresponding connecting brackets 19.

A bonding piece 22B of each of the connecting brackets 22 also has a cutout hole 22C that is open upward in a U-shape and positioned between the attachment pieces 22A. The lower end of each of the pivoting second front connecting member 14 and second rear connecting member 15 is to be received in the cutout hole 22C, thereby preventing the interference between the second front connecting member 14/the second rear connecting member 15 and the connecting brackets 22.

Description of Scraping Operation

When the wheel loader 1 with the aforementioned ladder 10 performs the scraping operation, as shown in FIG. 3, the wheel loader 1 can be inclined with the front of the vehicle body 2 facing upward to a maximum limit where the departure-angle-defining line DL is in alignment with the ground GL. During such inclination, the lower end of the ladder 10 gradually becomes closer to the ground GL. At a predetermined inclination or more, the second front connecting member 14, the second rear connecting member 15, and the second step board, which define the lower end of the ladder 10, begin to pivot. Subsequently, the first front connecting member 11, the first rear connecting member 12 and the first step board 13 pivot. Thus, the entire ladder 10 pivot toward the rear of the vehicle and is folded between the departure-angle-defining line DL and the connecting position of the ladder 10 to the vehicle body 2.

On the other hand, when the wheel loader 1 moves backward after finishing the scraping of the mound, the departure-angle-defining line DL (i.e., the counter-weight lower surface 2B) is gradually apart from the ground GL, where the folded ladder 10 is gradually returned to an original state.

Advantage(s) of Embodiment(s)

According to the exemplary embodiment, in the ladder 10, since the first front connecting member 11 and the first rear connecting member 12 forming the top of the ladder 10 are rigid members, even when the length of the suspended part of the ladder 10 is increased to decrease the height from the ground, swinging of the second step board 16 (the lowest portion) toward the side remote from an operator stepping thereon is reducible, so that the operator can easily climb up and down the ladder 10. Moreover, since the second front connecting member 14 and the second rear connecting member 15 at the lowest portion are elastically deformable, even when the second front connecting member 14 and the second rear connecting member 15 are more frequently contacted with the ground since the length of the suspended part of the ladder 10 is increased to decrease the height from the ground, the second front connecting member 14 and the second rear connecting member 15 are not easily damaged, thereby enabling to improve durability.

Second Exemplary Embodiment

Figure 4:
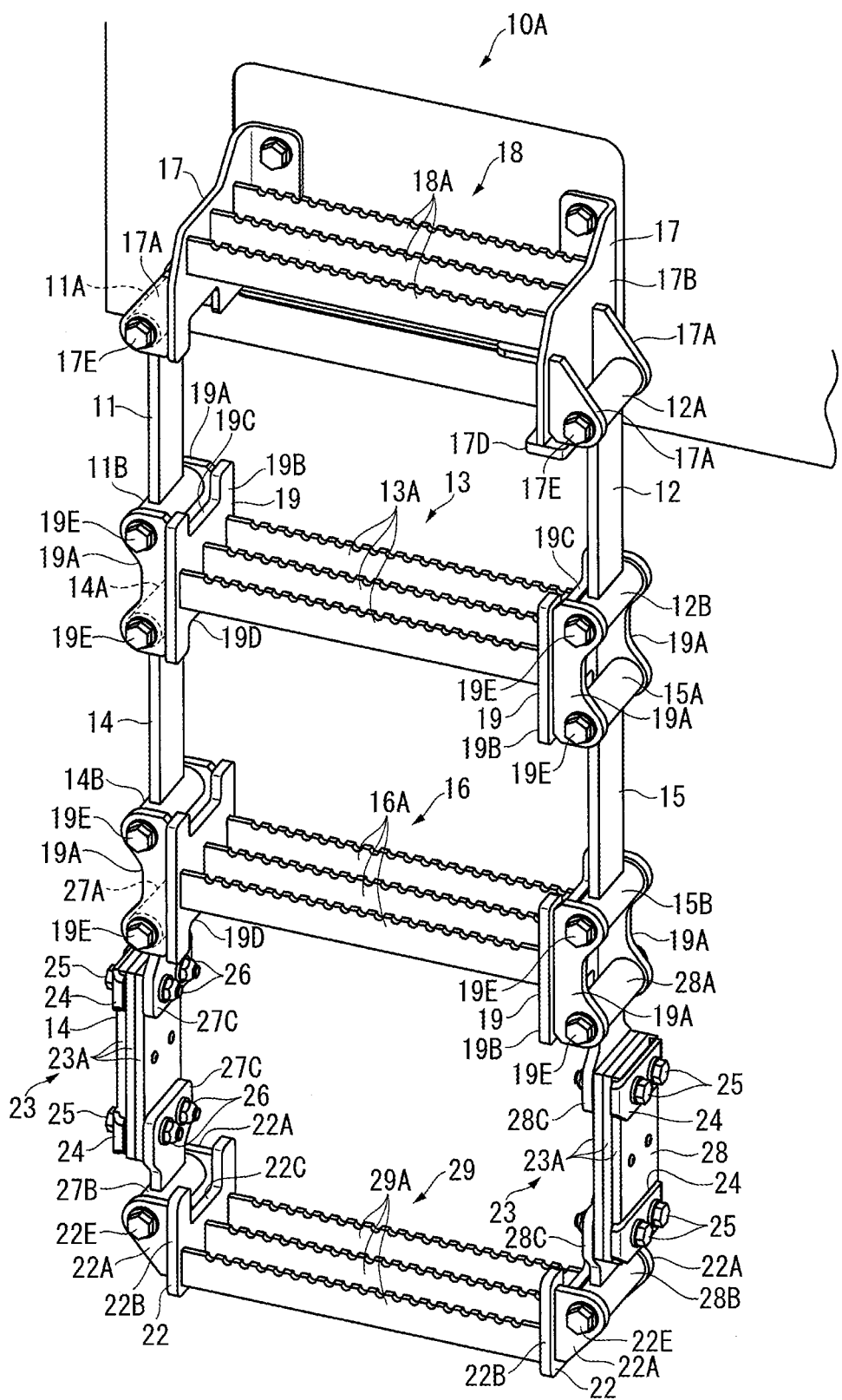
FIG. 4 is a perspective view of a ladder according to a second exemplary embodiment of the invention.

FIG. 4 is a perspective view of a ladder 10A according to a second exemplary embodiment of the invention.

The ladder 10A in a three-step structure includes: the first front connecting member 11 and the first rear connecting member 12, respective upper ends of which are connected in a pivotally movable manner to a lateral side of the vehicle body 2 and which are juxtaposed with a predetermined space in a vehicle front-back direction; the first step board 13 connected in a pivotally movable manner to respective lower ends of the first front connecting member 11 and the first rear connecting member 12; the second front connecting member 14 and the second rear connecting member 15, respective upper ends of which are connected in a pivotally movable manner to both ends of the first step board 13 in the vehicle front-back direction; the second step board 16 that is connected in a pivotally movable manner to respective lower ends of the second front connecting member 14 and the second rear connecting member 15; a third front connecting member 27 and a third rear connecting member 28, respective upper ends of which are connected in a pivotally movable manner to both ends of the second step board 16 in the vehicle front-back direction; and a third step board 29 that is connected in a pivotally movable manner to respective lower ends of the third front connecting member 27 and the third rear connecting member 28. In the second exemplary embodiment, the first front connecting member 11, the first rear connecting member 12, the second front connecting member 14 and the second rear connecting member 15 each are a rigid member (e.g., a metal material). The third front connecting member 27 and the third rear connecting member 28 are formed including an elastic material and elastically deformable.

Specifically, the ladder 10A has a three-step structure including: one step defined by the first step board 13, and the first front connecting member 11 and the first rear connecting member 12, respective lower ends of which are connected to the first step board 13 in a pivotally movable manner; one step defined by the second step board 16, and the second front connecting member 14 and the second rear connecting member 15, respective lower ends of which are connected to the second step board 16 in a pivotally movable manner; and one step defined by the third step board 29, and the third front connecting member 27 and the third rear connecting member 28, respective lower ends of which are connected to the third step board 29 in a pivotally movable manner. As a whole, the ladder 10 has three step boards (i.e., the first step board 13, the second step board 16 and the third step board 29). The respective upper ends of the second front connecting member 14 and the second rear connecting member 15 are connected to both ends of the first step board 13 immediately above the second front connecting member 14 and the second rear connecting member 15. The respective upper ends of the third front connecting member 27 and the third rear connecting member 28 are connected to both ends of the second step board 16 immediately above the third front connecting member 27 and the third rear connecting member 28.

The third step board 29 is formed of three metallic plates 29A in the same manner as in the first exemplary embodiment. The third front connecting member 27 and the third rear connecting member 28 each include the block laminate 23 in which a plurality of elastic plates 23A formed of an elastic material (e.g., synthetic rubber and natural rubber) are integrally riveted. Metallic hinge members 27C and 28C respectively formed with the cylindrical portions 27A and 27B and the cylindrical portions 28A and 28B are fixed to upper and lower ends of the laminate 23 with a seat 24, a bolt 25 and a nut 26. Other specific structures (e.g., the folding structure of the entire latter 10A) are the same as those in the first exemplary embodiment. The components such as the connecting brackets and the bolts used in the same manner as in the first exemplary embodiment are shown in the drawing with the same reference numerals as in the first exemplary embodiment and the detailed description of the components is omitted.

Also in the second exemplary embodiment, since the first front connecting member 11 and the first rear connecting member 12 which are top portions among portions connected to the vehicle body 2 are rigid members, swinging of the third step board 29, which is the lowest portion among the portions connected to the vehicle body 2, toward the side remote from the operator stepping on the third step board 29 is reducible, so that the operator can easily climb up and down the ladder 10A. Moreover, since the third front connecting member 27 and the third rear connecting member 28 which are the lowest portion are elastically deformable, even when the third front connecting member 27 and the third rear connecting member 28 are more frequently contacted with the ground since the length of the suspended part of the ladder 10A is increased to decrease the height from the ground, the third front connecting member 27 and the third rear connecting member 28 are not easily damaged, thereby enabling to improve durability.

The invention is not limited to the above-described embodiment, but includes modifications and improvements as long as an object of the invention can be achieved.

For instance, although the exemplary embodiment of the invention provided with the top step board 18 is described, the top step board 18 is not a requisite of the invention but may be omitted as needed in consideration of a distance between the first step board 13 and the engine compartment, or the like.

Although the bonding piece 17B of the rear connecting bracket 17, the bonding pieces 19B of the front and rear connecting brackets 19, and the bonding pieces 22B of the front and rear connecting bracket 22 have the respective cutout holes 17C, 19C and 19D, and 22C, the interference between the connecting members and the connecting brackets may be avoided by changing shapes of the attachment pieces and the bonding pieces without providing such cutout holes. However, since a strength of the entire connecting brackets is possibly affected by a significant change in a size of the attachment pieces and a shape of the bonding pieces and the like, the structure provided with the cutout holes is suitable for avoiding the interference.

The ladder 10 is described with reference to the drawing showing that the ladder 10 is folded toward the back of the vehicle body. However, under the condition that there is no risk of the ladder 10 being caught by one of the rear wheels 5B, the regulating plate 17D may be omitted and the ladder 10 may be folded toward the front of the vehicle body in a symmetric state with respect to the state of the ladder 10 folded toward the back of the vehicle body.

The elastically deformable connecting member may be provided by a piece of rubber plate to be elastically deformable, or alternatively, may be provided by a composite member of a rubber plate and a flexible metal plate (e.g., lead) to be elastically deformable.

The ladder of the invention may be provided not only in a two-step structure or a three-step structure but also in a multi-step structure having four or more steps. At least at a top step among steps positioned above a lowest step, the front connecting member and the rear connecting member only needs to be rigid members. At least at the lowest step among the steps positioned under the top step, the front connecting member and the rear connecting member only needs to be elastically deformable. Accordingly, the front connecting member and the rear connecting member at the steps provided between the top step and the lowest step may be determined as needed to be rigid members or elastically deformable in consideration of the number of steps required for the entire ladder, the required rigidity and the like.

The invention is applicable to a working vehicle including an off-road dump truck and the like in addition to a wheel loader.

The invention claimed is:

1. A ladder of a working vehicle, the ladder comprising a plurality of steps having at least a top step and a lowest step, each of the steps comprising:
    a step board; and
    a front connecting member and a rear connecting member, respective lower ends of which are connected in a pivotally movable manner to both ends of the step board in a vehicle front-back direction, wherein
        the front connecting member and the rear connecting member at the top step have respective upper ends connected in a pivotally movable manner to a lateral side of a vehicle body and are juxtaposed with a predetermined space therebetween in a vehicle front-back direction,
        respective upper ends of the front connecting member and the rear connecting member at each of the steps positioned under the top step are connected in a pivotally movable manner to opposing ends in the vehicle front-back direction of the step board of immediately-above one of the steps,
        the front connecting member and the rear connecting member at least at the top step among the steps positioned above the lowest step are rigid members,
        the front connecting member and the rear connecting member at least at the lowest step among the steps positioned under the top step are elastically deformable members, each of the deformable members being pivotally connected to connecting brackets respectively provided at the opposing ends of the step board of the immediately-above one of the steps via hinge members, each of the connecting brackets including a bonding piece that is attached to the step board and that defines one or more cutout holes that are open upward or downward,
        the one or more cutout holes are configured, based on the pivoting of the hinge members of the deformable members toward the one or more cutout holes, to receive and surround a corresponding portion of the deformable members, and
        the ladder is configured, based on the pivoting of each of the rigid members and each of the hinge members of the deformable members, to be folded to fit between a departure-angle-defining line that connects a rear wheel of the vehicle body and a vehicle rear bottom of the vehicle body and connected positions of the front connecting member and the rear connecting member to the vehicle body, wherein the hinge members are positioned laterally outward of the bonding pieces in the vehicle front-back direction.

2. The ladder of the working vehicle according to claim 1, wherein the entire ladder is configured to be folded to fit between the departure-angle-defining line and connected positions of the front connecting member and the rear connecting member to the vehicle body.

3. The ladder of the working vehicle according to claim 1, wherein the ladder is configured to be folded based on the pivoting of each of the rigid members and each of the deformable members toward the rear of the vehicle.

4. The ladder of the working vehicle according to claim 3, wherein each of the rigid members and each of the deformable members are configured, based on being pivoted toward the rear of the vehicle, to be oriented parallel to the step board.

5. The ladder of the working vehicle according to claim 1, wherein each of the one or more cutout holes has an upward U-shape or a downward U-shape.

6. A ladder of a working vehicle in a two-step structure, comprising:
    a first front connecting member and a first rear connecting member, respective upper ends of which are connected in a pivotally movable manner to a lateral side of a vehicle body, and which are juxtaposed with a predetermined space in a vehicle front-back direction;
    a first step board that is connected in a pivotally movable manner to respective lower ends of the first front connecting member and the first rear connecting member;
    connecting brackets provided at opposing ends of the first step board in the vehicle front-back direction;
    a second front connecting member and a second rear connecting member, respective upper ends of which are attached to hinge members, the hinge members being connected in a pivotally movable manner to the corresponding connecting brackets; and
    a second step board that is connected in a pivotally movable manner to respective lower ends of the second front connecting member and the second rear connecting member, wherein
        the first front connecting member and the first rear connecting member are rigid members,
        the second front connecting member and the second rear connecting member are elastically deformable members,
        each of the connecting brackets comprises a bonding piece that is attached to the first step board and that defines one or more cutout holes that are open upward or downward,
        the one or more cut holes are configured, based on the pivoting of the front and rear connecting members toward the one or more cutout holes, to receive and surround a corresponding portion of the front and rear connecting members, and the ladder is configured, based on the pivoting of each of the rigid members and each of the hinge members of the deformable members, to be folded to fit between a departure-angle-defining line that connects a rear wheel of the vehicle body and a vehicle rear bottom of the vehicle body and connected positions of the front connecting member and the rear connecting member to the vehicle body, wherein the hinge members are positioned laterally outward of the bonding pieces in the vehicle front-back direction.

7. The ladder of the working vehicle according to claim 6, wherein the entire ladder is configured to be folded to fit between the departure-angle-defining line and connected positions of the front connecting member and the rear connecting member to the vehicle body.

8. The ladder of the working vehicle according to claim 6, wherein the ladder is configured to be folded based on the pivoting of each of the rigid members and each of the deformable members toward the rear of the vehicle.

9. The ladder of the working vehicle according to claim 8, wherein each of the rigid members and each of the deformable members are configured, based on being pivoted toward the rear of the vehicle, to be oriented parallel to the step boards.

10. The ladder of the working vehicle according to claim 6, wherein each of the one or more cutout holes has an upward U-shape or a downward U-shape.

11. A ladder of a working vehicle in a three-step structure, comprising:
a first front connecting member and a first rear connecting member, respective upper ends of which are connected to a lateral side of a vehicle body, and which are juxtaposed with a predetermined space in a vehicle front-back direction;
a first step board that is connected in a pivotally movable manner to respective lower ends of the first front connecting member and the first rear connecting member;
a second front connecting member and a second rear connecting member, respective upper ends of which are connected in a pivotally movable manner to both ends of the first step board in the vehicle front-back direction;
a second step board that is connected in a pivotally movable manner to respective lower ends of the second front connecting member and the second rear connecting member;
connecting brackets provided at opposing ends of the second step board in the vehicle front-back direction;
a third front connecting member and a third rear connecting member, respective upper ends of which are attached to hinge members, each of the hinge members being connected in a pivotally movable manner to the corresponding connecting brackets; and
a third step board that is connected in a pivotally movable manner to respective lower ends of the third front connecting member and the third rear connecting member, wherein
the first front connecting member, the first rear connecting member, the second front connecting member, and the second rear connecting member are rigid members,
the third front connecting member and the third rear connecting member are elastically deformable members,
each of the connecting brackets comprises a bonding piece that is attached to the second step board and that defines one or more cutout holes that are open upward or downward,
the one or more cut holes are configured, based on the pivoting of the front and rear connecting members toward the one or more cutout holes, to receive and surround a corresponding portion of the front and rear connecting members, and
the ladder is configured, based on the pivoting of each of the rigid members and each of the hinge members of the deformable members, to be folded to fit between a departure-angle-defining line that connects a rear wheel of the vehicle body and a vehicle rear bottom of the vehicle body and connected positions of the front connecting member and the rear connecting member to the vehicle body, wherein the hinge members are positioned laterally outward of the bonding pieces in the vehicle front-back direction.

12. The ladder of the working vehicle according to claim 11, wherein the entire ladder is configured to be folded to fit between the departure-angle-defining line and connected positions of the front connecting member and the rear connecting member to the vehicle body.

13. The ladder of the working vehicle according to claim 11, wherein the ladder is configured to be folded based on the pivoting of each of the rigid members and each of the deformable members toward the rear of the vehicle.

14. The ladder of the working vehicle according to claim 13, wherein each of the rigid members and each of the deformable members are configured, based on being pivoted toward the rear of the vehicle, to be oriented parallel to the step boards.

15. The ladder of the working vehicle according to claim 11, wherein each of the one or more cutout holes has an upward U-shape or a downward U-shape.

16. A ladder of a working vehicle, the ladder comprising a plurality of steps having at least a top step and a lowest step, each of the steps comprising:
a step board; and
a front connecting member and a rear connecting member, respective lower ends of which are connected in a pivotally movable manner to both ends of the step board in a vehicle front-back direction, wherein
the front connecting member and the rear connecting member at the top step have respective upper ends connected in a pivotally movable manner to a lateral side of a vehicle body and are juxtaposed with a predetermined space therebetween in a vehicle front-back direction,
respective upper ends of the front connecting member and the rear connecting member at each of the steps positioned under the top step are connected in a pivotally movable manner to opposing ends in the vehicle front-back direction of the step board of immediately-above one of the steps,
the front connecting member and the rear connecting member at least at the top step among the steps positioned above the lowest step are rigid members,
the front connecting member and the rear connecting member at least at the lowest step among the steps positioned under the top step are elastically deformable members, each of the deformable members being pivotally connected to connecting brackets respectively provided at the opposing ends of the step board of the immediately-above one of the steps via hinge members, each of the connecting brackets comrpises a bonding piece that is attached to the step board and that defines one or more cut holes that are open upward or downward, the one or more cut holes are configured, based on the pivoting of the front and rear connecting members toward the one or more cut holes, to receive and surround a corresponding portion of the front and rear connecting members, a lower end of the ladder is configured, based on the ladder not being folded, to be suspended beyond a departure-angle-defining line that connects a rear wheel of the vehicle body and a vehicle rear bottom of the vehicle body, and the lower end of the ladder is configured, based on the pivoting of each of the rigid members and each of the hinge members of the deformable members, to fit between the departure-angle-defining line and connected positions of the front connecting member and the rear connecting member to the vehicle body, wherein the hinge members are positioned laterally outward of the bonding pieces in the vehicle front-back direction.

17. The ladder of the working vehicle according to claim 16, wherein the entire ladder is configured to be folded to fit between the departure-angle-defining line and connected positions of the front connecting member and the rear connecting member to the vehicle body.

* * * * *